US006292824B1

(12) United States Patent  
Siksa

(10) Patent No.: US 6,292,824 B1  
(45) Date of Patent: Sep. 18, 2001

(54) FRAMEWORK AND METHOD FOR FACILITATING CLIENT-SERVER PROGRAMMING AND INTERACTIONS

(75) Inventor: Mary Ellen Siksa, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/119,483

(22) Filed: Jul. 20, 1998

(51) Int. Cl.[7] ................................................ G06F 15/16
(52) U.S. Cl. ................................. 709/202; 709/203
(58) Field of Search ................................ 709/202, 203

(56) References Cited

U.S. PATENT DOCUMENTS

| | | | |
|---|---|---|---|
| 5,768,505 | * 6/1998 | Gilchrist et al. | 709/201 |
| 5,822,585 | * 10/1998 | Noble et al. | 709/300 |
| 5,850,517 | * 12/1998 | Verkler et al. | 709/202 |
| 5,881,230 | * 3/1999 | Christensen et al. | 709/203 |
| 6,047,311 | * 4/2000 | Ueno et al. | 709/202 |
| 6,065,039 | * 5/2000 | Paciorek | 709/202 |

* cited by examiner

Primary Examiner—Krisna Lim
(74) Attorney, Agent, or Firm—JoAnn Kealy Crockatt; Anne Vachon Dougherty

(57) ABSTRACT

The inventive framework provides the tools for management of requests for services by clients, by assigning the request to the right service-providing entity in the server. In addition, the framework allows a two-tiered view into the functions of the server. The invention also provides the means to start the server from a client location, and/or to start other remotely-located partner applications from a client location. Most significantly, the framework allows virtually any type of function (e.g., database management and lookups, file transfers, graphical status displays, etc.) to be added to the client-server code without the need for changing the code in the framework itself. The inventive framework is independent of the implementation language of the client; the location of the client (i.e., remotely located or local to the server location); and the means of communication between the client and the server (e.g., TCP/IP, Novell LAN protocols, IPC, etc.). While the base classes and abstract interfaces are provided in an implementation language such as C++, it is not necessary to write the client in the same language, thereby providing greater flexibility across a myriad of systems.

17 Claims, 3 Drawing Sheets

FRAMEWORK AND METHOD FOR FACILITATING CLIENT-SERVER PROGRAMMING AND INTERACTIONS

FIELD OF THE INVENTION

This invention relates to client-server computer relationships and more particularly to a framework for facilitating rapid development and enhancement of client-server applications without requiring re-programming at the server.

BACKGROUND OF THE INVENTION

The trend in the computer industry has been toward client-server systems whereby a plurality of independent computers (clients) can connect to a remote server in order to obtain access to a host of applications, stored data, etc., thereby eliminating the need to store all applications at the independent computers. Most application developers create each client-server application anew, without building on any previous work. After development, the server applications are generally provided at the server, with concurrent uploading of corresponding client applications on the client systems. Such efforts consume a great amount of time and effort, some of which is repetitive from one application to another. Moreover, many functions which are desirably included as classes of operations for a given application are commonly duplicated in many, if not all, other resident applications. It would be desirable to provide base functionality for all applications to be developed for the client-server environment.

It is therefore an objective of the present invention to provide a framework for facilitating development and enhancement of client-server applications.

It is another objective of the invention that the framework allow for development and enhancement of client-server applications without the need for re-programming the framework.

It is yet another objective of the invention to provide the foregoing framework with base classes to use for implementing specific functions of new applications without the need for coding in new classes for those functions.

SUMMARY OF THE INVENTION

These and other objectives of the invention are realized by the present invention wherein a method and framework for client-server interactions are provided. The method and framework allow for rapid development of client-server applications using any language that supports polymorphism and overloading, such as C++, Java, Smalltalk or OOPLX. The inventive framework provides the tools for management of requests for service by clients, including assigning the request to the right service-providing entity in the server. In addition, the framework allows a two-tiered view into the functions of the server. The invention also provides the means to start (or, boot) the server from a client location, and/or to start other remotely-located partner applications from a client location. Most significantly, the framework allows virtually any type of function (e.g., database management and lookups, file transfers, graphical status displays, etc.) to be implemented in the client-server code without the need for changing the code in the framework itself.

An application level language is optionally provided which can be enhanced or replaced by the user. The inventive framework is independent of the implementation language of the client; the location of the client (i.e., remotely located or local to the server location); and the means of communication between the client and the server (e.g., TCP/IP, Novell LAN protocols, IPC, etc.). While the base classes and abstract interfaces are provided in an implementation language such as C++, it is not necessary to write the client in the same language, thereby providing greater flexibility across a myriad of systems.

The inventive system additionally provides default functions such as error handling, problem tracing, a client request queue, and a sub-framework for building output services (e.g., to be used to respond to a client, log information, and/or communicate with yet another application), any of which can be implemented in the application or overridden by the programmer. Interprocess communications can also be readily achieved using the subject framework, once again without altering the framework code itself.

BRIEF DESCRIPTION OF THE DRAWINGS

The invention will now be described in greater detail with specific reference to the accompanying drawings wherein.

DESCRIPTION OF THE PREFERRED EMBODIMENT

Definitions

Figure 1:
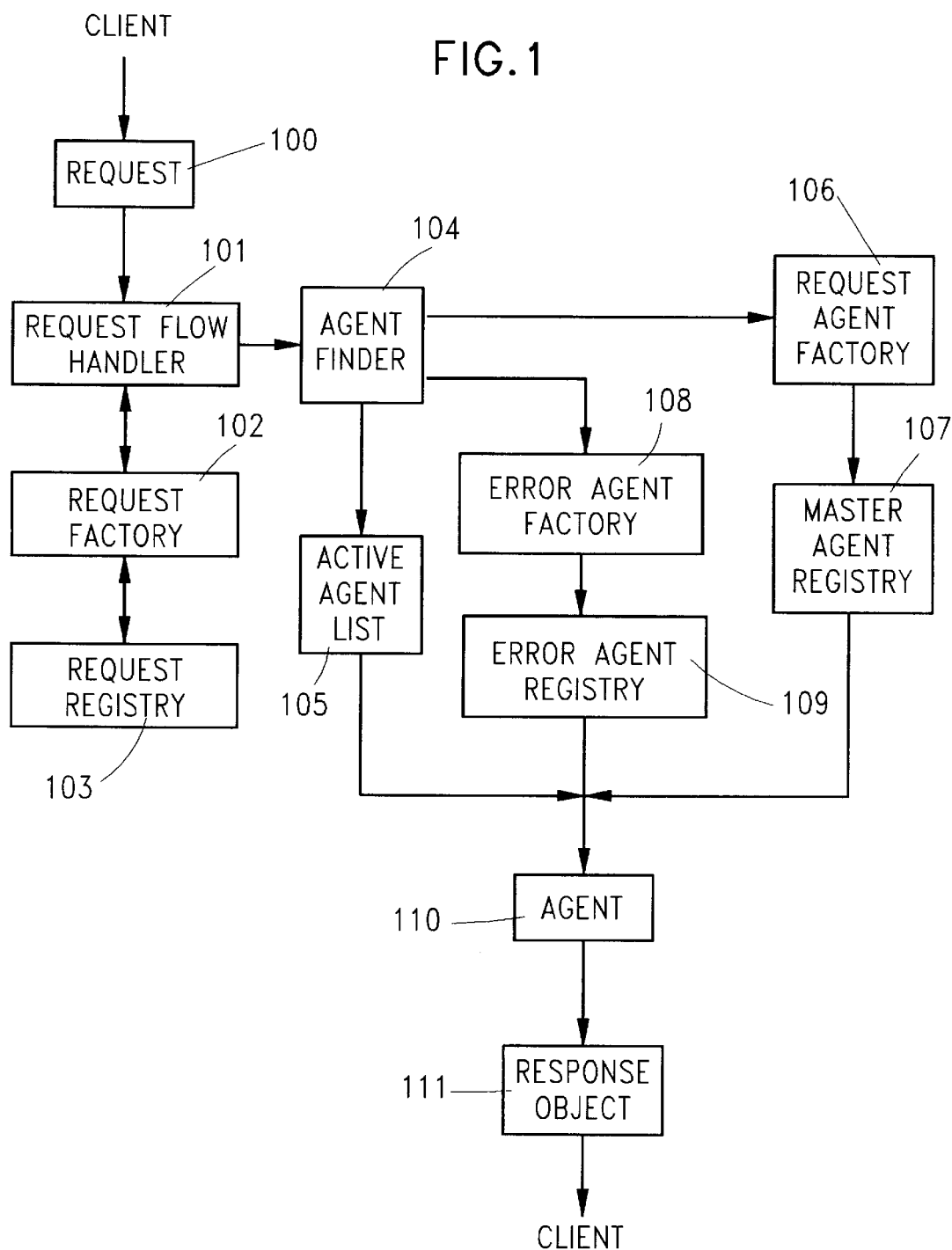
FIG. 1 provides a schematic diagram of the framework design.

In describing the invention, the following terms, provided with definitions for the purposes of this description, will be used:

programming language—any language that supports polymorphism and overloading, such as C++, Java, Smalltalk or OOPLX; however, for the purposes of the ensuing description, the C++ programming language will be assumed;

programmer—the user of the inventive system who need only have a familiarity with the relevant programming language (hereinafter, C++) to add functionality to the server;

client-server—a relationship wherein two applications work together, usually via a local area network or interprocess communications; one application (i.e., the server) acting as the central source of data and/or functions, with multiple clients locally accessing and operating on the data and invoking the functions (hereinafter defined as "classes") provided by the server;

agent—an object-oriented metaphor for a class (or a collection of classes) that does work on behalf of the client;

request—a solicitation by the client to the server for one unit of work (e.g., a single database lookup request);

response—the reply from the server to the client, usually containing a value indicative of success or failure of the request, and possibly containing additional application data;

class—a template which becomes an object when instantiated in C++ or other language wherein the class contains data and methods for operating on that data;

subclass—a means by which programmers extend or enhance code in a class;

registry—a class provided by the framework that keeps an inventory of those new classes written by the programmer which add functionality to the framework;

factory—a class which creates other classes, usually by finding what to create through a registry; or, if no class is available through the registry, by resorting to a default object provided by the framework; and framework—a kit or collection of C++ classes that can be used to start building applications. Frameworks have some functions by default, but are primarily provided for a programmer's use. The programmer uses the framework by enhancing it to provide various kinds of functionality. Programmers extend and enhance the framework by subclassing the classes provided by the framework. The framework encapsulates the flow of the work, but not the work itself, and provides methods in its code to which the programmer adds for customization of functionality for a specific application. A programmer (a) adds to the framework of classes for building applications and (b) subclasses for extension or enhancement of existing applications.

Framework Overview

The inventive framework provides a substantial amount of code for client-server communications, request handling, error handling, tracing and output services, any of which may be overridden by the programmer if so desired. The framework classes handle one of the most common formats for client-server communications, the GDS, or Generalized Data Stream for passing request and response packets between designated request objects and response objects (discussed further below). The application level language provided by the framework consists of request header information and request data formatted into GDS. The data stream consists of at least the header segment containing the request ID, primary and secondary agent handles (to be discussed further herein) and a unique client identifier. The header segment also contains a request reference, comprising a free format field which the client can use to supply an identifier for the specific request. The framework will return the request reference to the client in each response generated by the server as a result of the request.

The header segment also contains information to qualify the request, or information that applies to the request as a whole, rather that to an individual data segment. The header segment may be followed by one or more segments of request data specific to the application. Each segment of request data has a unique identifier and a set of items called parameters. Each parameter has a unique identifier, a length and a value.

Classes provided by the invention will parse the GDS and provide the header and data segments as attributes in a request object (further detailed below). Similarly, the framework provides classes to transform a response object into a response GDS with a header segment and data segments. The response header will contain the response ID, the agent handles, client ID, request reference, a return code indicating the result of the request's processing, and a flag to indicate whether this is the last response from the server or if more response data will follow.

The framework provides interprocess communications (IPC) facilities, which include a request queue that holds IPC data until it can be processed by the framework. Also included in the framework classes is an error agent, which will take a return code and optional substitution parameters, use the return code to index into an error file of text messages, substitute for variables in the messages using the parameters passed from the caller, and format the data into a response object and send it to the client.

A trace agent is additionally provided by the framework, to take a trace message number and optional substitution parameters, use the message number to index into a trace file of text messages, substitute for variables in the message using the parameters passed in from the caller, format the data, and write it to a trace file.

Finally, the framework classes include a sub-framework which handles the response objects. Once the response objects are built by agents inside the framework, the request and associated response objects are passed to the output framework. The output framework can be configured by the programmer to log each request and response to a log file, showing the contents of the header and the data segments. The default format is a simple free format showing the request ID, the response ID, the agent handles, etc. and the data segments.

Framework Design and Operation

The main object in the inventive framework is the Request Flow Handler (hereinafter, "RFH"), object 101 in FIG. 1. The RFH is able to access Request Objects for receiving requests 100 from the Request Factory 102, which has an associated Request Registry 103. The RFH also obtains Agents to handle requests by accessing the Agent Finder 104. The Agent Finder 104 is, in turn, connected to obtain Agents from the Active Agent List 105, from the Error Agent Factory 108, with its associated Error Agent Registry 109, or from the Agent Factory 107, which has access to the Master Agent Registry 110. The assigned Agent 111 then responds to the client via Response Object 112. Also shown in FIG. 1 is an Inactive Agent list 105, which will discussed further below.

Figure 2A:
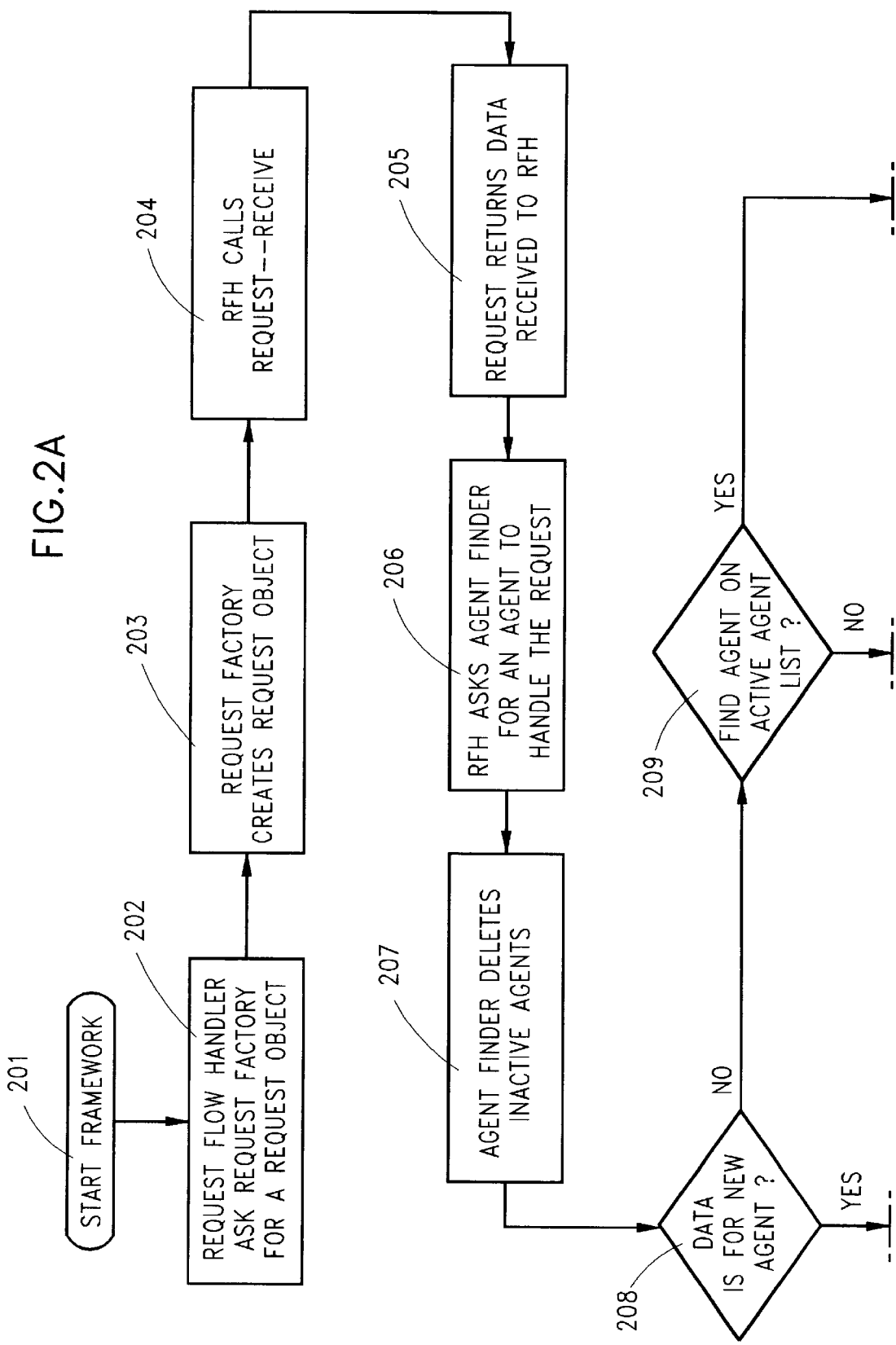
FIG. 2 provides a representative process flow for processing a request utilizing the framework of the present invention.
Figure 2B:
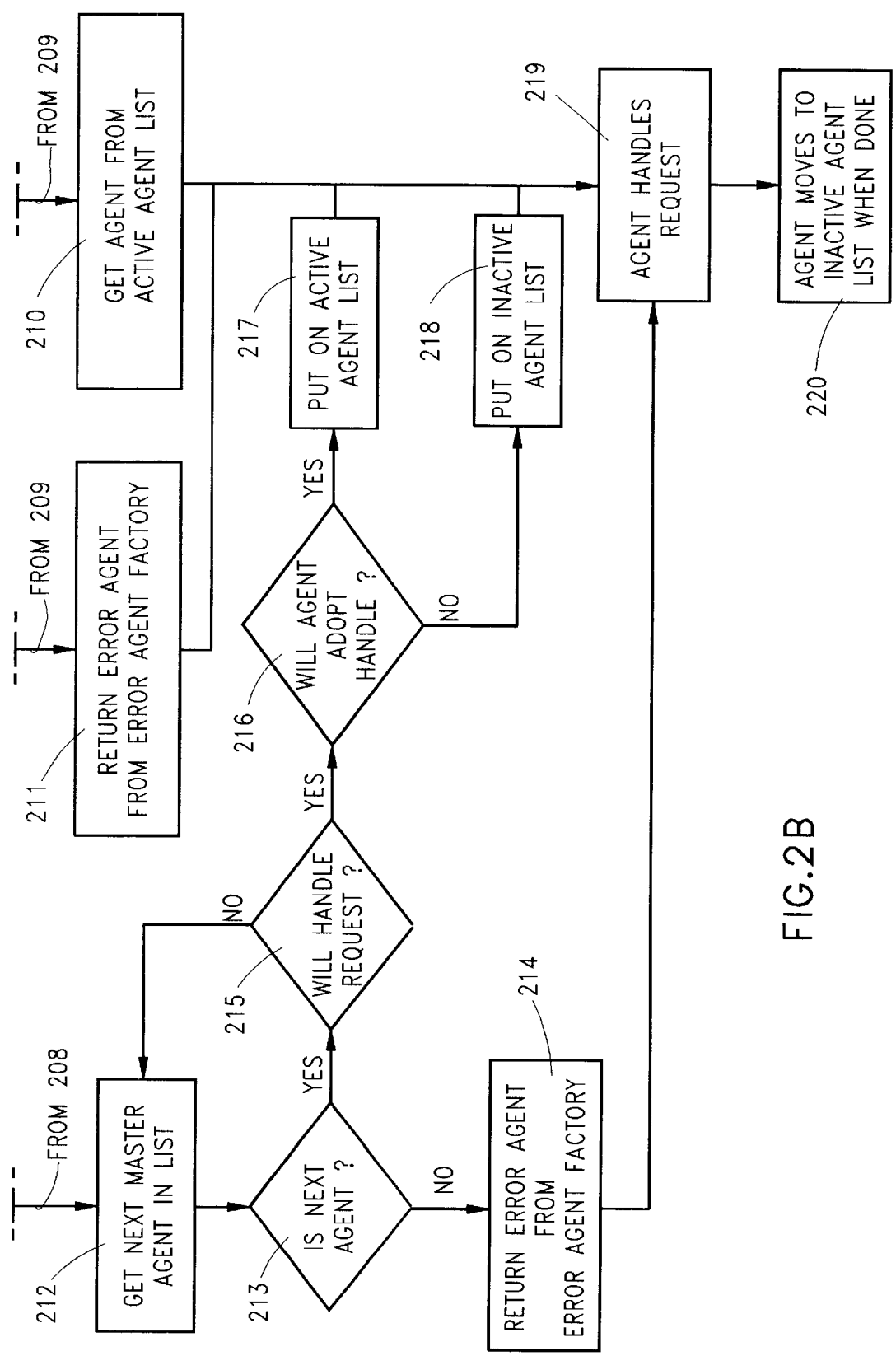

In FIG. 2, the process flow for a client request in accordance with the present invention is depicted. When the RFH is invoked, it retrieves a Request Object from the Request Factory at 202 and calls its Receive method at 204. The Request Object waits for a request from a client. When a request is received, control is returned to the framework at 205. Each request is uniquely identified by a numeric value, called a Request ID. Request IDs are implementation dependent, created at the client, but defined at the server. For example, one client may use short integers (1 to 32,767) to identify a request. The Request may additionally include an alphanumeric identifier of an Agent, as discussed further below.

The main object in the framework, the Request Flow Handler (the "RFH"), receives the Request ID, yet operates independent of the meaning of the number (i.e., Request ID) selected; only needing it to identify the request to the Master Agents, so that one of them can create an agent to handle the request. The numeric ID is meaningful to the client and to the agent that adopts the request, but only provides a means for the RFH to associate a request with the appropriate agent.

Once the request has been made, the RFH proceeds to seek out an Agent for handling the request. The RFH asks the Agent Finder, at 206, for an Agent to handle the request. At the Agent Finder, the Agent Finder first deletes any Inactive Agents from its lists, at 207. Next, in step 208, it is determined whether the data is for a new agent or if the request includes an Agent Handle (i.e., an alphanumeric identifier for a previously designated Agent). If the Request has an Agent Handle, then the Agent Finder simply looks to retrieve the Agent from the Active Agent List at step 209 and proceeds to get the Agent from the Active Agent List at step 210. In the instance wherein the Agent identified by the Agent Handle cannot be found on the Active Agent List (i.e., a "no" determination at decision box 209), the system returns an Error Agent from the Error Agent Factory at step 211. If, however, there is no Agent Handle, such that the data is for a new Agent, the Agent Finder accesses the Master Agent to see if one of the Master Agents will respond with a new Agent to handle the request, at 212. The Agent Finder shows the Request ID to each Master Agent on the list until one responds by creating an instance of the particular Agent that will handle the request. To find an Agent when there is an Agent Handle present in the request, the Agent Finder needs to find the Agent in the Active Agent list with a handle that matches the handle in the request. Matching an agent can be done either by checking each agent or by using the handle to hash into a list of Agent Handles. Since the Agent Handles are created by the framework, and therefore have meaning to the framework, they can be used as indices or for hashing. The request IDs, however, have no meaning to the framework, and therefore, no assumptions can be made about how they relate to the Master Agents. Consequently, each Master Agent must be checked to see if it will respond with a new Agent to handle the request. At decision box 213, the determination is made as to whether the next Master Agent is available, and further, at decision box 214, if the agent will handle the request.

To register Master Agents, the programmer must subclass the Framework's Master Agent class for each type of agent that will be created to handle requests. The Master Agent subclass may have a single or a collection of integer Request IDs that it supports. The programmer must instantiate one each of the new Master Agent subclasses and pass each to the Register( ) method of the agent Factory. In C++, such is done by creating a static instance of each Master Agent subclass, and having each register itself with the Agent Factory in its constructor. The Agent Factory maintains a list of all the Master Agents that have registered. This design allows new functionality to be added to the framework dynamically, without updating the framework itself.

The Agent Factory will query each Master Agent registered at step 214 to see if it supports the request ID received from the client. If the Master Agent matches the request ID with one that it supports, it will instantiate an Agent to service the request at step 215. If the Master Agent does not recognize the request ID, it returns nothing and the Agent Factory goes on to check the next Master Agent in its list, at 212. If no Master Agent supports the request ID, and there are no more Master Agents registered, as determined at 213, the Agent Factory will retrieve and return an Agent from the Error Agent Factory to the Agent Finder at step 216.

By default, the framework's Error Agent will return a message to the client describing the error. The message will contain information from the request, such as the Request ID, the Agent Handle, and any other information accessible to the framework. The Error Agent Factory design allows for the programmer to subclass the framework's default Error Agent to provide the desired functionality in the event that such an error occurs. The programmer registers the Error Agent subclass with the Error Agent Factory, just as the Master Agents are registered with the Agent Factory. If such an Agent was registered, the Error Agent Factory would return that Error Agent, instead of a default one, to handle the orphaned request.

If the Master Agent supports the Request ID, and returns a newly-instantiated Agent, the Agent Factory will then return the new Agent to the Agent Finder. The Agent Finder places the Agent on the Active Agent list if the Agent accepts the Agent Handle assignment, or on the Inactive Agent List if the Agent will not accept the Agent Handle assignment, at step 217. The Inactive Agents on the list are deleted once the current request is processed, while Active Agents are not deleted until the client so directs. The programmer subclasses the framework's Agent class to handle requests with whatever functionality is desired. What the Agent does is of no concern to the RFH. At step 218, the programmer's Agent subclass is given responsibility for the request via its Adopt( ) method.

Once the Agent has been provided for handling the request, at 218, and the RFH has given responsibility to the Agent, the RFH returns to the waiting state and awaits the next client Request. The designated Agent proceeds to obtain a Response Object and to respond to the client hereby handling the Request. The response to the client optimally includes the Agent Handle so that the client can pass additional requests to the same Agent.

A general implementation example of the foregoing would be when a programmer wants the designated Agent to access another application that exists on the server. In that case, the programmer's Agents would take the data carried in the Request and format it into something which the existing application can process, before passing it on to the existing application. The Agent adopts the request and performs the unit of work described in the Request. A specific example would be a mail processing agent. This agent would take a client request to send a file to another user. The request data segment would include the address of the recipient as well as the name of the file to send. The Agent would then read the data from the file and send it, using the appropriate file transfer protocol, to the mailbox of the recipient. Another specific example would be an Address Book Agent. This Agent would take a client Request to add a new address to an address book database. The Request data segment would contain a nickname for the user along with an e-mail address.

Every Agent subclass must support the following methods: Adopt, to accept responsibility for a request from the client; SetFirstHandle; GetFirstHandle; SetSecondHandle; GetSecondHandle; SetClientKey; GetClientKey; and Shutdown, to perform any final cleanup on itself.

The invention supports two classes of agents, Active and Inactive Agents. An Active Agent will adopt additional requests, beyond the first that it was initially created to handle. An Inactive Agent can only process a single request. When the Agent Finder tries to assign an Agent Handle to an Active Agent, the Active Agent accepts the handle and is added to the Active Agent List at 217 of FIG. 2. Inactive Agents, however, will not accept a handle and the Agent Finder accordingly adds that new Agent to the Inactive Agent List at 218, and goes on to 219 where the Agent handles the request. Whether the Agent accepts the handle at 217, or does not accept a handle at 218, the processing proceeds to 219 wherein the Agent handles the request. At 215, if the Agent will not handle the request (i.e., the Master Agent will not create an Agent to handle the request), then the processing loops back to 212 and looks for the next Master Agent in the list.

Each time the RFH asks the Agent Finder to get an agent to handle a request, the Agent Finder first deletes all of the Agents on the Inactive Agent List from the system. Conveniently, by the time the Inactive Agents are deleted, those agents would have completed their processing. Since Inactive Agents will only handle a single request, they do not maintain state, whereas Active Agents are normally used to maintain some state information across calls. State information is implementation dependent. For example, if one request must be issued before issuing another, the state information is used so the Agent remembers whether the requests are issued in the correct order. As an example, one application may require that an OpenDatebase request be issued before a ListDatabase request.

As noted above, each Agent is identified by an Agent Handle, which is simply an alphanumeric identifier that is unique for each invocation of the server. The invention supports two kinds of Agent Handles, first and second, which are both alphanumeric identifiers for Agents. For a Primary Agent, the first and second Agent Handles are equal, although such is not the case for Secondary Agents. The reason for first and second Agent Handles is so that the programmer can support multiple views into the server, supporting multiple users or multiple applications which are independent of one another. A two-tiered view into the server is used to separate multiple clients using the same type of objects (resources) in the server. For example, the programmer may use a Primary Agent to manage a view into the server for a single client. Each client that accesses the server will be represented by a Primary Agent. When the client needs services, the programmer will use Secondary Agents to provide those services. The Secondary Agents will be managed by the Primary Agent. When the client is ready to terminate its use of the server, the Primary Agent is shut down and, in turn, shuts down all of its Secondary Agents. In this way, only the Primary Agent must be shut down in order to release all of the resources which had been dedicated to the particular client.

A specific example is one where a "project" is used to represent a view into a server for a client. A project is represented by a Primary Agent and owns various other objects (e.g., databases, communications links, etc.) at the second tier. To access the resources, first a client must open a project, and then use the project to find other resources available to that project. The "project" is the main view into the server. If there are several projects opened at once, the design allows for management of the second tier objects as though they are owned by the first tier (i.e., the project). Each client opens a project first and then may access other resources available to that project, without interfering with other clients. Once a project is opened by a client, no other client can open the same project until the first has closed it. Second tier objects are owned by the first tier object/project, so if the project is "closed," the second tier objects related to it are automatically "closed" as well. Once a project is closed, it is (and its resources are) available for use by another client.

A Primary Agent is responsible for the first tier, and an optional Secondary Agent is responsible for the second tier. As mentioned above, a Primary Agent's first and second Agent Handles are the same. A Secondary Agent has it's Primary Agent's handle as its first handle and its own handle as a second handle. The Primary Agent "owns" the Secondary Agent. Secondary Agent should only be created if their Primary Agent has been created, and should be deleted before their Primary Agent has been deleted.

The Agent Finder assigns a second Agent Handle. If the programmer wants an agent to be a Primary Agent, when the second Agent Handle is assigned, the handle should be copied as its first Agent Handle as well. Active Agents can be either Primary or Secondary Agents, while Inactive Agents can only be Primary Agents. Inactive Agents cannot "own" other Agents, since they are designed to handle only a single request and then be deleted.

A Client Key is a unique identifier for the client application associated with an Agent. Each Agent can be associated with only one client. All Requests must contain a Client Key, identifying the requesting client. When a new Agent is created, the Agent Finder will copy the Client Key from the request into the Agent. The Active Agent List will identify and provide access to Agents by first Agent Handle, second Agent Handle, or Client Key.

The Agents must recognize some request ID as a Shutdown request from the client and must, in turn, call the RFH Shutdown method. The RFH will, in turn, call the Shutdown method for each agent that is either active or inactive, and then delete the agents. The programmer can decide what Shutdown means to his agents. For example, one shutdown method could disconnect the communications line and close databases, thereby simply giving the Agents a chance to do clean-up before the server is shutdown.

To add a new function to the framework, the programmer must register new classes to the framework. Each registry in the framework has a static Register method to be used by the programmer's new code. Any classes registered must be subclassed from the framework classes and must implement the appropriate interface. To register a class, the programmer would instantiate a static instance of the class, which calls the Registry's static Register method to its constructor. Under the present invention, the programmer registers a Request with the Request Registry to override the default behavior of the framework regarding receiving requests from the client, as discussed above with reference to subclassing the Request class. The programmer registers Master Agents with the Master Agent Registry. Each of the Master Agents supports the Create Agent method, which accepts a RequestID. If the Master Agent supports the Request ID, it should create a new Agent and return it to the Agent Factory. If the Request ID is not supported, it does not return an agent, and the Agent Factory will query the next Master Agent. If no Master Agents are registered, the framework will use the Error Agent to handle every request. The programmer registers an Error Agent with the Error Agent Registry to override the default error handling of the framework.

A Request Object works with the communications subsystem to receive requests from a client. Requests must contain some information required by the framework, but otherwise may contain data in any format which is appropriate for the application. Several communications subsystems would be provided by the framework, which subsystems could also be overridden by the programmer. The framework is independent of the method of communication. At the application level, a generalized data stream can be used to carry the requests and responses between the client and the server. While a generalized data stream is the most common way to carry information from a client to a server, a programmer could also use a fixed-format character string, or a variety of other methods.

It is to be noted that, if the programmer wishes to override the default behavior of the framework in order to support different requests formats or client-server communications protocols, then the programmer should subclass the Request class which has been provided with the Framework. Upon subclassing the Request class, new Request objects would then be registered with the Request Factory. To register New Request objects with the Request Factory, the programmer would instantiate an object of the new Request class and pass it to the Request Factory Register( ) method. Subsequently, and with specific reference to FIG. 2, when the RFH asks the Request Factory for a Request object, at 202, the Factory will create the object, at 203; and, in response to the RFH Request::Receive call at 204, the Request object will return an object of the programmer's registered subclass, instead of the default class, at 205. As noted above, the RFH will call the Request object's Receive( ) method at step 204. When the Receive( ) method completes, the RFH assumes a client request has been received. The RFH operations are unchanged regardless of the format of the request or of the method/protocol with which the request was received.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A framework for handling requests for services in a client-server computing environment comprising:

at least one request object for receiving services requests;

a request flow handler for obtaining at least one agent object for handling said requests for services; and an agent factory for creating at least one agent object for handling services requests at the server in response to input from said request flow handler.

2. The framework of claim 1 further comprising at least one trace agent.

3. The framework of claim 1 further comprising registry means for maintaining agent identifier information about said at least one agent.

4. The framework of claim 3 wherein each services request includes a request agent identifier, said framework further comprising means for comparing said request agent identifier to said registry agent identifier information.

5. The framework of claim 1 further comprising at least one error agent.

6. A method for utilizing a framework, having at least one request object, a request flow agent, and an agent factory for creating at least one agent object, to handle requests for services at a server in a client-server computing environment comprising the steps of:

receiving services requests at said at least one request object;

obtaining at least one agent object for handling said requests for services by accessing said agent factory for creating at least one agent object in response to input from said request flow handler; and said at least one agent object handling said services requests.

7. The method of claim 6 wherein said framework further comprises at least one registry for maintaining agent identifier information about created agents and wherein said obtaining comprises accessing at least one agent from said at least one registry.

8. The method of claim 7, wherein each services request includes a request agent identifier, and wherein said method further comprises comparing said request agent identifier to said registry agent identifier information.

9. The method of claim 6, wherein said framework further comprises an error agent factory for providing at least one error agent when said agent factory fails to create an agent.

10. A framework for handling requests for services in a client-server computing environment comprising:

a Request Factory for receiving requests for services;

at least one Request Registry associated with said Request Factory for maintaining information about said requests;

an Agent Factory for creating an Agent to handle each of said requests;

at least one Agent List of created Agents;

an Error Agent Factory 108 for providing Error Agents when said Agent Factory cannot create an Agent;

an Error Agent Registry 109 of Error Agents created by said Error Agent Factory;

an Agent Finder for obtaining Agents from one of said Agent Factory, said Active Agent list, and said Error Agent Factory, for handling said requests;

a Request Flow Handler object for receiving requests from the Request Factory and for communicating with said Agent Finder for obtaining Agents from said Agent Finder to handle requests.

11. In the framework of claim 10, a method for handling requests for services at a server comprising the steps of:

receiving services requests at said at least one Request Factory;

said Request Flow Handler obtaining at least one agent object for handling said requests for services by accessing said Agent Factory for creating at least one agent object in response to input from said Request Flow Handler; and said at least one agent object handling said services requests.

12. The method of claim 11 wherein said obtaining comprises accessing at least one agent from said at least one Agent list.

13. The method of claim 11, wherein each services request includes a request agent identifier, and wherein said method further comprises comparing said request agent identifier to information stored at said at least one Agent list.

14. The framework of claim 10 wherein said at least one Agent list comprises an Inactive Agent list.

15. The framework of claim 10 further comprising at least one Master Agent Registry associated with said Agent Factory.

16. The framework of claim 10 further comprising means for determining if one of said requests for services identifies an Agent on said at least one Agent list.

17. The framework of claim 10 wherein said at least one Agent list comprises an Active Agent list.

* * * * *